United States Patent [19]
Sewersky et al.

[11] Patent Number: 5,239,468
[45] Date of Patent: Aug. 24, 1993

[54] AUTOMATED HELICOPTER MAINTENANCE MONITORING

[75] Inventors: Richard A. Sewersky, Cheshire; George A. Molnar, Orange; Joseph L. Pratt, Shelton, all of Conn.

[73] Assignee: United Technologies Corporation, Hartford, Conn.

[21] Appl. No.: 624,373

[22] Filed: Dec. 7, 1990

[51] Int. Cl.⁵ ............................................. G06F 15/50
[52] U.S. Cl. ............................ 364/424.03; 364/424.06; 364/550
[58] Field of Search ............. 364/424.01, 424.04, 364/424.06, 508, 442, 550, 551.01

[56] References Cited
U.S. PATENT DOCUMENTS

| | | | |
|---|---|---|---|
| 4,053,123 | 10/1977 | Chadwick | 244/17.11 |
| 4,184,205 | 1/1980 | Morrow | 364/508 |
| 4,409,670 | 10/1983 | Herndon et al. | 364/900 |
| 4,470,116 | 9/1984 | Ratchford | 364/424.04 |
| 4,480,480 | 11/1984 | Scott et al. | 73/769 |
| 4,646,241 | 2/1987 | Ratchford et al. | 364/424.06 |
| 4,660,145 | 4/1987 | Hansen | 364/424.06 |
| 4,682,292 | 7/1987 | Bue et al. | 364/424.06 |
| 4,819,182 | 4/1989 | King et al. | 364/508 |
| 4,894,787 | 1/1990 | Flannelly et al. | 364/508 |
| 4,933,882 | 6/1990 | Molnar | 364/550 |
| 5,019,980 | 5/1991 | Starr et al. | 364/424.04 |
| 5,065,349 | 11/1991 | Thomas | 364/550 |

Primary Examiner—Thomas G. Black

[57] ABSTRACT

An automated helicopter maintenance monitoring system (20), which is comprised of a flight data recorder subsystem (22) and a maintenance computer subsystem (24), collects data from a plurality of sensors in order to facilitate helicopter maintenance. The system (20) processes vibration data, rotor track data, rotor phase data, and flight sensor data to determine when a helicopter fault has occurred or will occur. Additionally, the system (20) can prompt a pilot/maintainer to fly the helicopter through specific operational states in order to aid in the maintenance process.

18 Claims, 3 Drawing Sheets fig. 2 fig. 3

AUTOMATED HELICOPTER MAINTENANCE MONITORING

This invention was made with Government support under a contract awarded by the Department of the Army. The Government has certain rights in this invention.

TECHNICAL FIELD

This invention relates to the field of helicopter maintenance monitoring and more particularly to the field of automated helicopter maintenance monitoring.

BACKGROUND ART

A helicopter fault, which can be caused by either a misadjustment or a worn or broken component, will generally manifest itself as excessive helicopter vibrations. Excessive vibrations can also cause other faults and can contribute to crew fatigue. Therefore, it is desirable to find the source of the vibrations and remedy the problem.

A maintenance crew can eliminate excessive vibrations by replacing and/or adjusting all of the components which might be a possible cause. However, this method will increase maintenance time for the helicopter. Furthermore, since all of the possible components which could explain the vibrations are replaced, this method will needlessly deplete spare parts stores.

The maintenance crew may employ the procedure outlined in Army Maintenance Manual #TM55-1520-237-23-7, wherein an excessive vibration source is isolated using a plurality of accelerometers, attached at various locations throughout the helicopter, to measure vibrations. However, aircraft vibrations sometimes have complex interactions which make the process of determining the correct set of adjustments and/or component replacements time consuming and which therefore may require numerous expensive test flights.

DISCLOSURE OF THE INVENTION

Objects of the invention include isolating helicopter faults.

According to the present invention, an automated helicopter maintenance monitoring system uses automatically collected vibration data and helicopter regime information to determine helicopter faults and to anticipate future helicopter faults. According further to the present invention, an automated helicopter maintenance monitoring system prompts a user to fly a helicopter through specific operational states in order to facilitate helicopter maintenance.

The foregoing and other objects, features and advantages of the present invention will become more apparent in light of the following detailed description of exemplary embodiments thereof, as illustrated in the accompanying drawings.

BEST MODE FOR CARRYING OUT THE INVENTION

Figure 1:
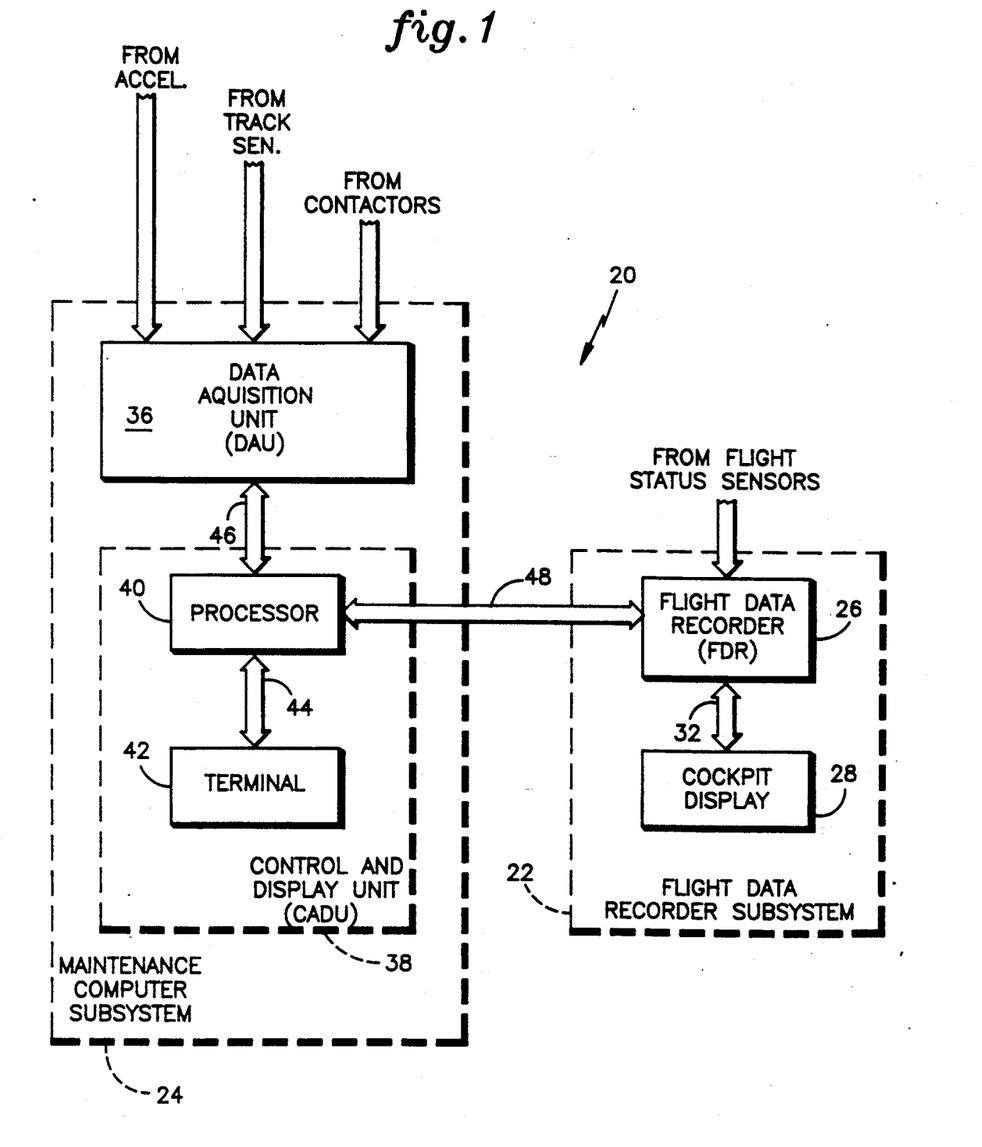
FIG. 1 is a schematic block diagram of an automated helicopter maintenance monitoring system.

Referring to FIG. 1, an automated helicopter maintenance monitoring system 20 for a UH-60A helicopter is comprised of a flight data recorder subsystem 22 and a maintenance computer subsystem 24. The system 20 performs a variety of functions including automatically collecting and storing helicopter vibration and main rotor blade track data, issuing status messages when a particular measurement indicates that a component has failed or is about to fail, trending data in order to predict when a particular component will require servicing, and directing a pilot or a maintainer to fly through certain operational states in order to facilitate helicopter maintenance. The specific functions performed by the system 20 are described in more detail hereinafter.

The flight data recorder subsystem 22 is comprised of a flight data recorder (FDR) 26 and a cockpit display 28. The FDR 26, part #100-60290 manufactured by Canadian Marconi of Kanata, Canada, is connected to a plurality of flight sensors (not shown) which provide electrical signals indicative of weight on wheels (i.e. whether the helicopter is on the ground), tail rotor driveshaft bearing temperature, main rotor speed, engine torque, airspeed, rate of climb, angle of bank, yaw rate, and altitude. The FDR 26 also has provision for connection to a ground processor unit (not shown, part #100-602048 manufactured by Canadian Marconi of Kanata, Canada) which can receive from the FDR 26 digital electrical signals indicative of various flight parameters stored within the FDR 26.

The cockpit display 28, part #100-602043 manufactured by Canadian Marconi of Kanata Canada, is a computer terminal having an electronic, electroluminescent screen (not shown) and keys (not shown) for a user to press. The cockpit display 28 communicates with the FDR 26 via a digital electrical bus 32, which is implemented by means known to those skilled in the art using the RS-232 communications protocol. Electrical signals indicative of information to be displayed are passed from the FDR 26 to the cockpit display 28 via the bus 32. Similarly, electrical signals indicative of keys pressed by the user are passed from the cockpit display 28 to the FDR 26 via the bus 32.

The maintenance computer subsystem 24 is comprised of a data acquisition unit (DAU) 36 and a control and display unit (CADU) 38. The DAU 36, part #29106500 manufactured by Scientific Atlanta of San Diego Calif., is connected to and receives electrical signals from accelerometers (not shown), a main rotor track sensor (not shown), and from rotor contactors (not shown). The main rotor track sensor, part #29106100 manufactured by Scientific Atlanta of San Diego Calif., provides a digital electrical signal according to the flap and lag positioning of the main rotor blades. The contactors, part #27288400 manufactured by Scientific Atlanta of San Diego Calif., are standard magnetic contactors which provide a single electrical pulse per revolution of the main rotor and the tail rotor.

The accelerometers, part #766-1 manufactured by Wilcoxon Research of Rockville Md., provide a 100 mV/G electrical signal and are permanently mounted at various locations throughout the helicopter to provide electrical signals according to the amount of vibration of the main rotor, the tail rotor, the cabin absorber, the first engine drive shaft, the second engine drive shaft, and the oil cooler. The positioning and mounting of the accelerometers is described in Army Maintenance Manual #TM55-1520-237-23-7. For measuring the main rotor vibration, four accelerometers are used. Three of the accelerometers are mounted vertically (i.e. are mounted for measuring vibrations along a vertical axis of the helicopter) at the pilot's side of the cockpit, the copilot's side of the cockpit, and the nose of the helicopter, respectively. The fourth main rotor accelerometer is mounted laterally within the helicopter cockpit. The tail rotor accelerometer is mounted on the tail rotor gearbox. Additional backup accelerometers are provided for the four main rotor accelerometers.

The DAU 36 has provision for processing input data. A Fast Fourier Transform (FFT) is performed on the vibration data from the accelerometers in order to provide a set of digital data indicative of the magnitude of the vibration measured by each accelerometer as a function of frequency. The DAU 36 also uses phase information from the contactors to provide a set of digital data indicative of the phase of the main rotor vibration as a function of frequency and to provide a set of data indicative of the phase of the tail rotor vibration as a function of frequency.

The CADU 38, part #29106401 manufactured by Scientific Atlanta, is comprised of a processor 40 and a terminal 42, which communicate via an internal electronic bus 44. The terminal 42 has an electronic liquid crystal screen (not shown) and keys (not shown) for a user to press. Keystrokes entered by a user at the terminal 42 are converted to digital electrical signals and passed to the processor 40 via the electrical bus 44. Similarly, information to be displayed at the screen of the terminal 42 is passed as electrical signals from the processor 40 to the terminal 42 via the bus 44.

The processor 40 of the CADU 38 communicates with the DAU 36 via a digital electrical bus 46, which is implemented by means known to those skilled in the art using the RS-422 communications protocol. The processor 40 sends commands, in the form of digital electrical signals, to the DAU 36 to request the collection of specific data in a specific manner. When the requested data collection is complete, the DAU 36 transfers the data, also in the form of digital electrical signals, to the processor 40.

The processor 40 also communicates with the FDR 26 via a digital electrical bus 48, which is implemented by means known to those skilled in the art using the RS-232 communications protocol. Under certain conditions, which will be described in more detail hereinafter, keystrokes entered by a user at the cockpit display 28 are processed by the FDR 26 and passed on, in the form of digital electrical signals, to the processor 40. Additionally, the processor 40 can send commands, also in the form of digital electrical signals, to request the FDR 26 to provide signals indicative of flight sensor data which is then transferred from the FDR 26 to the processor 40 via the bus 48.

Diagnostic software for performing automated helicopter maintenance monitoring is embedded in a ROM (not shown) and a battery backed RAM (not shown) within the processor 40 of the CADU 38. The battery backed RAM is loaded with software by the ground processing unit. For the purposes of monitoring, the FDR 26 acts as a slave to the processor 40. Requests for information from the FDR 26 and requests to display information on the cockpit display 28 are initiated by the processor 40. The keys of the cockpit display 28 are polled by the processor 40. The FDR 26 does, however, unilaterally capture some information (such as certain types of parameter anomalies) without being specifically requested to do so.

The system 20 has four main operational modes: monitoring mode, maintenance mode, expert mode, and utility mode. In monitoring mode, the system 20 initiates the periodic collection of data, determines if the data indicates a present or imminent fault, and displays status information on the cockpit display 26. In maintenance mode, the system 20 uses the cockpit display 26 to instruct the pilot to fly the helicopter through certain operational states in order to facilitate the collection of data for maintenance purposes. In expert mode, the user is given full access to all maintenance computer subsystem measurements. In utility mode, the user can view vibration and track data and can modify certain system parameters.

A user can change the mode of the system 20 by pressing keys on either the cockpit display 28 or the CADU 38. When the system 20 is operating in the monitor mode or the maintenance mode, the diagnostic software automatically collects data from the sensors and displays status information. Any faults which are indicated by the collected data are reported to the user via the cockpit display 28. The system 20 does not automatically collect accelerometer data in the expert mode or the utility mode.

There are four types of status information generated and displayed by the diagnostic software: notes, advisories, cautions, and warnings. A note is informational only and requires no action by the pilot. An advisory is used for items which the pilot needs to know but which do not threaten the safety of the helicopter. A caution is used for a condition which has a high probability of causing harm. A warning indicates the occurrence of an event which creates a potential life threatening condition. The only condition which initiates a warning is the loss of the tail rotor drive, which is determined by a comparison of main and tail rotor speed ratios.

By pressing keys at either the cockpit display 28 or the CADU 38, the user can request that the system 20 store the present value and the previous history of various flight parameters (such as accelerometer data, airspeed, pitch, yaw rate, etc.) obtained from the sensors connected to the FDR 26 and the DAU 36. The data from the sensors connected to the FDR 26 is stored in RAM located within the FDR 26 and data from the sensors connected to the DAU 36 is stored in RAM located within the CADU 38. The stored data from the FDR 26 can be offloaded to the ground processor unit at a later time. The user can press keys at the CADU 38 to request that the stored data be displayed at the CADU 38.

The vibration generated by the main rotor and the tail rotor is a function of the operational state of the helicopter. A given vibration which is considered excessive at one particular operating state may be acceptable at another particular operating state. The system 20 accounts for this by dividing the operational states of the helicopter into a plurality of regimes, each of which defines a particular set of operating conditions. Vibration data from the rotors is processed according to the regime of the helicopter at the time of data collection.

The regime of the helicopter is determined by the FDR 26 which provides a signal indicative of the regime to the CADU 38 after the regime has been stable for at least three seconds. The detection of helicopter regimes is described in detail in U.S. Pat. No. 4,933,882, to Molnar et. al., titled "Regime Recognition", which is hereby incorporated by reference.

Table 1, below, illustrates the particular operational values for monitoring mode regimes. W.O.W. stands for Weight On Wheels, which, if ON indicates that the helicopter is on the ground. ROTOR SP is the percent of normal operational value of the rotor speed and AIRSPEED is the airspeed of the helicopter in knots.

TABLE 1

| Monitoring mode regimes | | | |
|---|---|---|---|
| REGIME | W.O.W. | ROTOR SP (%) | AIRSPEED (Knots) |
| START FLIGHT | ON | 30-98 | 0-35 |
| FLAT PITCH | ON | 98-102 | 0-35 |
| HOVER | OFF | 98-102 | 0-35 |
| 80 KIAS | OFF | 98-102 | 70-90 |
| 120 KIAS | OFF | 98-102 | 110-135 |
| 145 KIAS | OFF | 98-102 | 135-150 |
| VH | OFF | 98-102 | 150-200 |
| END FLIGHT | ON | 30-98 | 0-35 |

In addition to the values of Table 1, above, each of the regimes except END FLIGHT requires that the engine torque be between 10 and 142 percent of full operational value (END FLIGHT requires that the engine be shut off, i.e. the torque is 0% of full value). Also, each of the above regimes requires that the rate of climb for the helicopter be within +/−500 feet/minute, the angle of bank be within +−/15 degrees, and the yaw rate be within +/−10 degrees per second. For the HOVER regime, the helicopter must be between 10 and 1500 feet off the ground.

Table 2, below, which is similar to Table 1, illustrates the particular operational values for maintenance mode regimes. Note that the range of some of the parameters is less than the range for Table 1. This occurs because in maintenance mode, the data is being collected for the express purpose of maintaining the helicopter and hence greater accuracy is required to establish a regime.

TABLE 2

| Maintenance mode regimes | | | |
|---|---|---|---|
| REGIME | W.O.W. | ROTOR SP (%) | AIRSPEED (Knots) |
| START FLIGHT | ON | 30-99 | 0-35 |
| FLAT PITCH | ON | 99-101 | 0-35 |
| HOVER | OFF | 99-101 | 0-35 |
| 80 KIAS | OFF | 99-101 | 75-85 |
| 120 KIAS | OFF | 99-101 | 115-125 |
| 145 KIAS | OFF | 99-101 | 140-150 |
| VH | OFF | 99-101 | 150-200 |
| END FLIGHT | ON | 30-99 | 0-35 |

In addition to the values of Table 2, above, each of the regimes except END FLIGHT requires that the engine torque be between 10 and 142 percent of full operational value (END FLIGHT requires that the engine be shut off, i.e. the torque is 0% of full value). Also, each of the above regimes requires that the rate of climb for the helicopter be within +/−200 feet/minute, the angle of bank be within +/−10 degrees, and the yaw rate be within +/−5 degrees per second. For the HOVER regime, the helicopter must be between 10 and 1500 feet off the ground.

In monitoring mode or maintenance mode, automatic collection of drive shaft and oil cooler vibration data is regime independent and is performed once every ten minutes. Similarly, automatic collection of data indicative of bearing temperature and main and tail rotor speed is also regime independent and is collected once every minute. However, no data collection for the above flight parameters is performed unless the rotor speed is between 98 and 102 percent of normal operational value for the monitoring mode and between 99 and 101 percent of normal operational value for the maintenance mode. Also, the frequency of collection of the above parameters is a function of the processing power of the CADU 38 and the FDR 26 and ideally data would be collected much more frequently for flight equipment having more processing power.

Automatic collection of main rotor and tail rotor vibration data is dependant upon the regimes of Tables 1 and 2, above. The diagnostic software collects up to three data samples of main and tail rotor vibration data for a given regime. If the regime changes before a complete sample has been collected, the data for that sample which has already been collected is discarded.

When operating in the maintenance mode, the helicopter diagnostic software places regime information on the cockpit display 28 in order to provide the user with instructions for flying the helicopter in a manner that facilitates the collection of data for maintenance purposes. The user selects a flight plan at the cockpit display 26 and the diagnostic software prompts the user to fly the helicopter at each regime of the flight plan. The system collects three data samples of the main and tail rotor vibrations at each regime and then prompts the user to fly at a different regime until three data samples have been collected for all of the regimes of flight plan.

Under certain conditions in the monitoring mode, the diagnostic software may detect a fault and prompt the user to fly the helicopter through certain regimes in order to collect more data to confirm the fault. Generally, regime prompting is driven by the flight plan for the maintenance mode and by data (when certain types of faults are detected) in the monitoring mode. Note that the user, if otherwise preoccupied, is always free to ignore regime prompts.

Upon powerup, software embedded within the FDR 26, the CADU 38, and the DAU 36 execute initialization sequences which perform hardware self-tests and establish communications between the various units. After the self-tests, the diagnostic software checks the main rotor accelerometers to determine if any anomalies are present (i.e. determines if any of the accelerometers are non-operational). If so, the diagnostic software will automatically reconfigure to use the backup main rotor accelerometers. The software then displays initial status information which indicates whether or not the automated helicopter maintenance monitoring system 20 is operational (i.e. the system 20 passes all of the initial self-tests) and also indicates any messages which were present at the end of the previous flight. The user may then enter any maintenance actions which were performed since the last flight and the system 20 will attempt to verify successful problem resolution.

Figure 2:
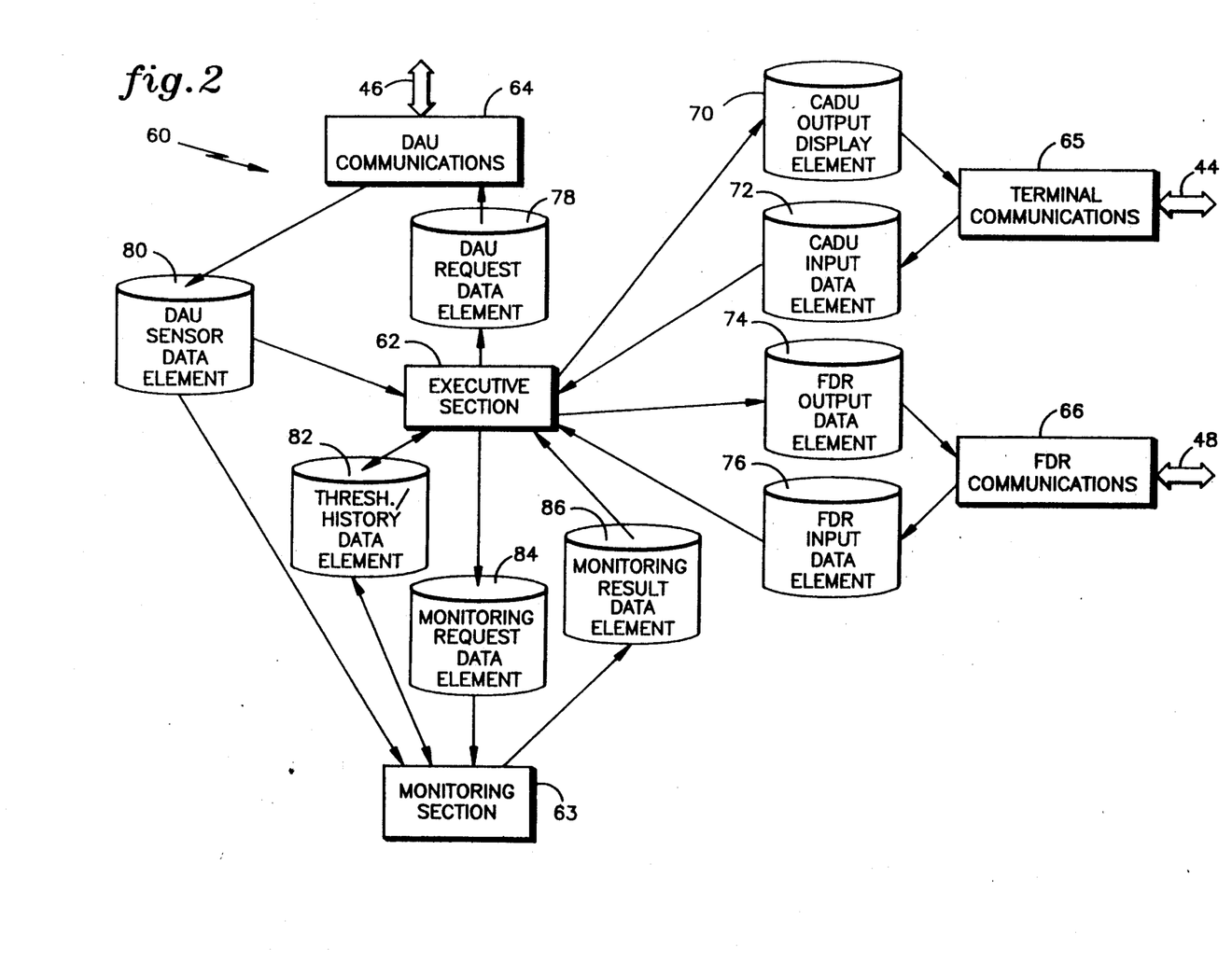
FIG. 2 is a dataflow diagram illustrating operation of diagnostic software.

FIG. 2 is a dataflow diagram 60 which illustrates operation of the diagnostic software. Boxes on the diagram 60 indicate program sections (i.e. portions of diagnostic software code) while cylinders indicate data elements (i.e. portions of diagnostic software data). Arrows between boxes and cylinders indicate the direction of the flow of data. Unlike a flowchart, no portion of the dataflow diagram 60 indicates any temporal relationships between the various sections.

The diagnostic software is comprised of an executive section 62, a monitoring section 63, a DAU communications section 64, a terminal communications section 65, and an FDR communications section 66. The executive section 62 handles overall operation of the diagnostic software. The monitoring section 63 performs automated monitoring functions of the diagnostic software. The DAU communications section 64 communicates with the DAU 36 via the bus 46. The terminal communications section 65 communicates with the terminal 42 of the CADU 38 via the bus 44. The FDR communications section 66 communicates with the FDR 26 via the bus 48.

The executive section 62 provides information to a CADU output data element 70 indicating what is to be displayed at the terminal 42 of the CADU 38. The CADU output data element 70 is provided as an input to the terminal communications section 65, which processes data from the CADU output data element 70 to provide electrical signals to the bus 44 for generating the appropriate display on the terminal 42. Electrical signals indicative of keys pressed by a user at the terminal 42 of the CADU 38 are provided on the bus 44 to the terminal communications section 65. The electrical signals are converted by the terminal communications section 65 to data which is written to a CADU input data element 72. The CADU input data element 72 is provided as an input to the executive section 62, which may perform a particular function or set of functions in response to the particular key or keys that have been pressed.

The executive section 62 provides data to an FDR output data element 74, which contains information to be displayed at the cockpit display 28, requests to the FDR 26 to transfer data from the FDR 26 to the CADU 38, and commands requesting the FDR 26 to perform various internal functions (such as storing or deleting a parameter time history, using a different regime table, or displaying a test screen on the cockpit display 28). The FDR output data element 74 is provided as an input to the FDR communications section 66, which processes data from the FDR output data element 74 to provide electrical signals to the bus 48 that interconnects the CADU 38 and the FDR 26.

Electrical signals from the FDR 26 are received by the FDR communications section 66 and processed into data that is written to an FDR input data element 76. The FDR input data element 76, which is provided as an input to the executive section 62, contains data indicative of keys pressed by the user at the cockpit display 28, information from flight sensors connected to the FDR 26, and the current regime status or other requested status from the FDR 26.

A DAU request data element 78, which is written to by the executive section 62, is provided as an input to the DAU communications section 64, which converts the data contained therein into electrical signals that are provided to the bus 46. The DAU request data element 78 contains information indicative of the particular sensor data requested by the diagnostic software. After the DAU 36 has performed the requested sensor data collection, it transmits the sensor data in the form of electrical signals on the bus 46. The signals are received by the DAU communications section 64 and converted into data which is written to a DAU sensor data element 80.

The monitoring section 63 is provided with input from the sensor data element 80, a threshold/history data element 82, and a monitoring request data element 84. The threshold/history data element 82 contains the fault thresholds and historical data for the flight parameters monitored by the system 20. The monitoring request data element 84, which is written to by the executive section 62, contains system information needed by the monitoring section 63 to properly perform monitoring functions. The monitoring section 63 processes the inputs from the data elements 80, 82, 84, and writes the result to a monitoring result data element 86, which is provided as an input to the executive section 62. When the system 20 is operating in the utility mode or the expert mode, no monitoring functions are performed and the monitoring section 63 is not executed.

The monitoring section 63 uses data from the sensor data element 80 to determine if a fault has occured or is about to occur. However, in some cases, the value of the sum or difference of the vibrations of two accelerometers is examined. Also, different values are examined depending upon the regime of the helicopter.

Table 3, below, lists the values which are examined for the different regimes. The frequencies listed are the frequencies at which the particular value is tested (i.e. the vibration at the listed frequency) where M is the period of the main rotor and T is the period of the tail rotor (the periods of the rotors are obtained from the contactors). For the accelerometers, PV stands for the vertically mounted accelerometer on the pilot's side of the cockpit, CV is the copilot vertical accelerometer, TG is the tail rotor gearbox accelerometer, CL is the cockpit lateral accelerometer, NV is the nose vertical accelerometer, CA is the cabin absorber accelerometer, and E1, E2, and OC are the engine #1 driveshaft, engine #2 driveshaft, and oil cooler accelerometers, respectively. Note that the examination of the engine #1 accelerometer, the engine #2 accelerometer, and the oil cooler accelerometer is regime independent. The GOAL, SPEC (specification), and DNE (do not exceed) entries, expressed in units of inches per second, are defaults which can be changed by the user (by pressing keys at the CADU 38) when the system 20 is operating in the utility mode. The purpose of the GOAL, SPEC, and DNE entries will be explained in more detail hereinafter.

TABLE 3

| REGIME | VALUE | FREQ | GOAL | SPEC | DNE |
|---|---|---|---|---|---|
| FLAT PITCH | CV − PV | 1/M | 0.10 | 0.20 | 0.50 |
| FLAT PITCH | TG | 1/T | 0.10 | 0.20 | 1.50 |
| HOVER | CV + PV | 1/M | 0.10 | 0.20 | 0.50 |
| HOVER | CV − PV | 1/M | 0.10 | 0.20 | 0.50 |
| 80 KIAS | CV + PV | 1/M | 0.10 | 0.20 | 0.50 |
| 80 KIAS | CV − PV | 1/M | 0.10 | 0.20 | 0.50 |
| 120 KIAS | CV + PV | 1/M | 0.10 | 0.20 | 0.50 |
| 120 KIAS | CV − PV | 1/M | 0.10 | 0.20 | 0.50 |
| 120 KIAS | CL | 1/M | 0.10 | 0.20 | 0.50 |
| 120 KIAS | NV | 4/M | 0.40 | 0.60 | 1.00 |
| 145 KIAS | CV + PV | 1/M | 0.10 | 0.20 | 0.50 |
| 145 KIAS | CV − PV | 1/M | 0.10 | 0.20 | 0.50 |
| 145 KIAS | CL | 1/M | 0.10 | 0.20 | 0.50 |
| 145 KIAS | CV + PV | 3/M | 0.15 | 0.20 | 0.30 |
| 145 KIAS | NV | 3/M | 0.30 | 0.40 | 0.60 |
| 145 KIAS | CV + PV | 4/M | 0.30 | 0.40 | 1.00 |
| VH | CV + PV | 1/M | 0.10 | 0.20 | 0.50 |
| VH | CV − PV | 1/M | 0.10 | 0.20 | 0.50 |
| VH | CL | 1/M | 0.10 | 0.20 | 0.50 |
| VH | CV + PV | 3/M | 0.15 | 0.20 | 0.40 |
| VH | NV | 3/M | 0.30 | 0.40 | 0.80 |
| | E1 | 350 Hz | 0.50 | 1.30 | 2.00 |
| | E2 | 350 Hz | 0.50 | 1.30 | 2.00 |

TABLE 3-continued

| REGIME | Monitored Values | | | | |
|---|---|---|---|---|---|
| | VALUE | FREQ | GOAL | SPEC | DNE |
| | OC | 70 Hz | 0.50 | 1.00 | 2.00 |

Figure 3:
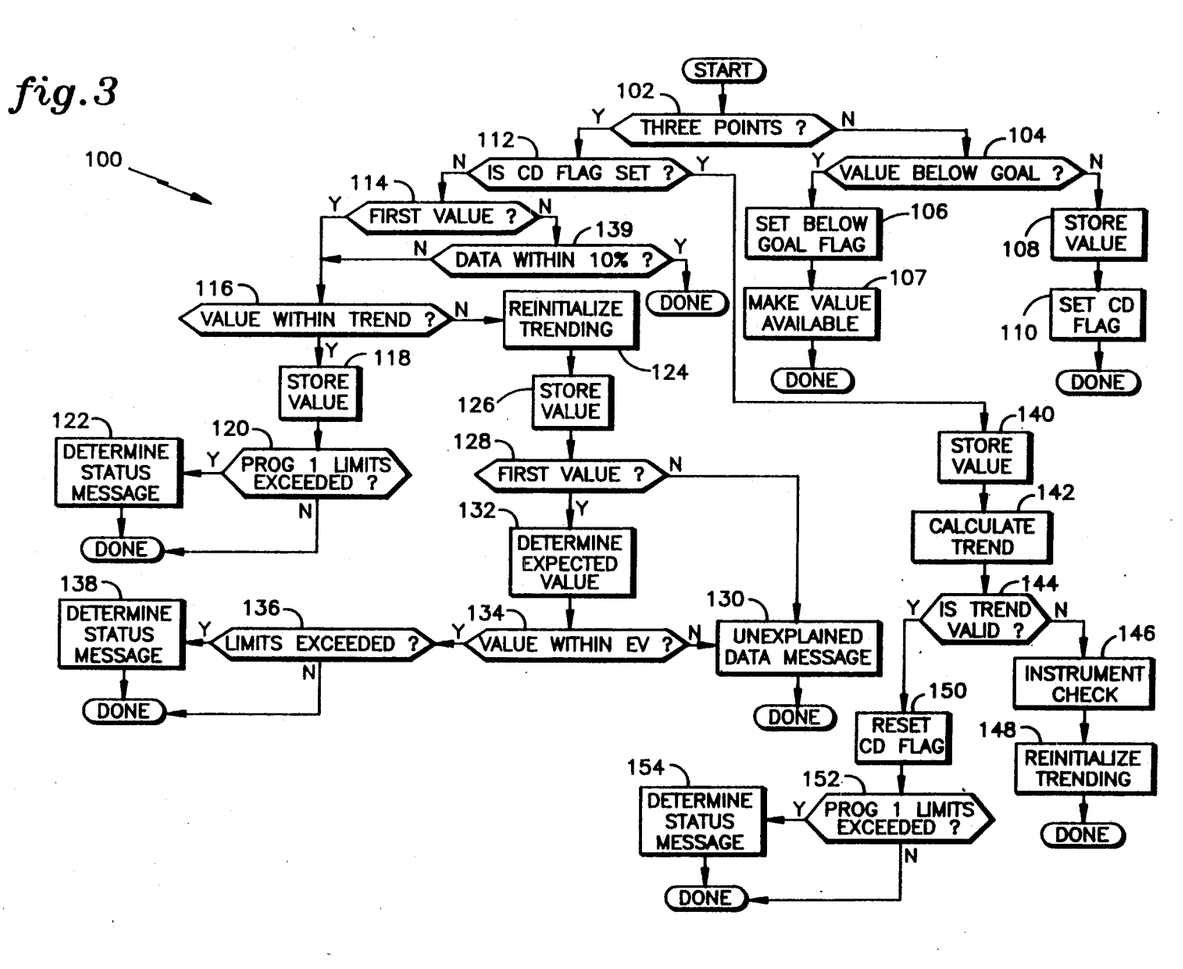
FIG. 3 is a flowchart illustrating operation of software for automated monitoring of helicopter vibration data.

FIG. 3 is a flowchart 100 which illustrates how the monitoring section 63 examines the values listed in Table 3, above. At a first step 102, a test is made to determine if there are at least three stored values from previous iterations of the software. Note that even if a flight has just begun, it is possible to have three or more stored values from past flights since values are stored in battery backed RAM. At the step 102, there may be less than three stored values either because the equipment has never been used in flight before (i.e. the very first flight) or because the values have been cleared from the battery backed RAM for reasons which will be explained in more detail hereinafter.

If there are not three stored values from previous iterations, control passes from the step 102 to a step 104, where the current value is compared to GOAL from Table 3, above. If the value is below GOAL, it is not stored and control passes from the step 104 to a step 106, where a BELOW GOAL flag is set. The BELOW GOAL flag is accessed by the diagnostic software and is used to cause a message to be placed on the CADU 38 to provide the user with an explanation as to why no trending data for a particular value has been stored. After the step 106, control passes to the step 107, where the value is made available to other processing routines which perform functions not related to trending. After the step 107, processing for the current iteration is complete.

If at the step 104 the current value is greater than or equal to GOAL, control passes from the step 104 to a step 108, where the current value is stored. After the step 108 is a step 110 where a CD FLAG variable is set. The CD FLAG facilitates the reconstruction of a new trend history for the value and will be explained in more detail hereinafter. After the step 110, processing for the iteration is complete.

If there are three stored values at the step 102, control passes to a step 112, where the CD FLAG is tested. If the CD FLAG is not set, indicating that a trend for the current value exists, control passes from the step 112 to a step 114, where a test is made to determine if the value being tested is the first of a particular value since the beginning of the flight. Note that since most of the values of Table 3 are regime dependent, having the helicopter enter a regime for the first time is likely to result is some of the values being first values. If the value being examined is a first value, control passes from the step 114 to a step 116, where the value is examined in light of a linear historical trend for that particular value. The historical trend for a value, the calculation of which is described in more detail hereinafter, indicates the change in the value as a function of time. The value of the vibration at time equals zero (i.e. the y intercept) is known, and the change in vibration per unit time (i.e. the slope) is known. At the test step 116, a projected value is calculated from the historical trend and is compared with the actual value. If the actual value is within ten percent of the projected value, the current value is deemed to be within the trend and control passes from the step 116 to a step 118, where the current value is stored for future use.

After the step 118 is a step 120, where the value is tested against GOAL, SPEC, and DNE of Table 3 and the limits are deemed to have been exceeded if either the value is greater than SPEC or the value is greater than GOAL and projected to exceed SPEC within four hours. The trend is used to perform the projection. If the limits have not been exceeded, processing for the iteration is complete. Otherwise, control passes from the step 120 to a step 122, where a status message to be posted at the cockpit display 28 is determined. If the value is over DNE or is projected to exceed DNE within one hour a caution message is issued. If the value is greater than SPEC but not projected to exceed DNE within one hour, an advisory message is issued. Otherwise, if the data is between GOAL and SPEC and projected to exceed SPEC within four hours, a note is issued. In all cases, the display will indicate recommended actions or action alternatives, such as component replacement, adjustment, requests to the user to fly through specific regimes, etc.

If at the test step 116 the value is not within the projected trend value, control passes from the step 116 to a step 124, where the trend history (i.e. all of the previously stored values) is cleared. Control passes from the step 124 to a step 126 where the current value is stored.

Following the step 126 is a test step 128, where a test is made to determine if the value being tested is the first of a particular value since the beginning of the flight. If the current value is not the first value, control passes from the step 128 to a step 130, where the monitoring software causes an unexplained caution data message to be placed on the display of the CADU 38 and the cockpit display 28. The unexplained data message indicates to the user the occurrence of an anomaly from one or more of the accelerometers and will request the user to repeat the regime to acquire confirming data.

When the result at the step 128 indicates that the current value is a first value, control passes from the step 128 to a step 132 where an expected value is determined. One explanation for the value not being within 10% of the projected trend value at the step 116 is that a maintenance action has changed the vibratory characteristics of one or more helicopter components. When maintenance is performed, the maintainer enters the information at the CADU 38. That information is used at the step 132 to determine an expected value, i.e. a value which can be derived as a result of the particular maintenance performed. For example, adjustment of the tail rotor may lower the vibrations measured by the tail rotor accelerometer.

After the step 132 is a test step 134, where the actual value is compared to the expected value. If the actual value is not within 20% of the expected value, control passes to the step 130 where the unexplained data caution message is displayed. The message includes a request for the pilot to repeat the particular regime in order to collect more values to confirm the current anomalous value. The monitoring section 63 will construct a new trend history for the value on the next two iterations because trending has been reinitialized at the previous step 124.

If, on the other hand, the actual value is within 20% of the expected value, control passes from the step 134 to a test step 136, where a limit test is done on the actual value. The limit test at the step 136 is different than the limit test at the step 120 since the trend history has been cleared at the step 124. No prognosis of the value can be performed at the step 136. Therefore, the actual value is compared against GOAL. If the value is less than GOAL, processing is complete. Otherwise, control passes from the step 136 to a step 138, where the status message to be posted at the cockpit display 28 is determined. Unlike the status message determination at the step 120, no prognosis can be performed at the step 138 because the trend history has been cleared at the step 124. If at the step 138 the value is between GOAL and SPEC, a note message is issued. If the value is between SPEC and DNE, an advisory message is issued and if the value is greater than DNE, a caution message is issued.

Returning to the step 114, if the value being examined is not the first of a particular value since the beginning of the flight, control passes from the step 114 to a test step 139, where the current value is compared to the stored value from a previous iteration (such as the value stored at the step 118 or at the step 126). If the current value is within 10% of the stored value, processing for the current iteration is complete and the current value is discarded. If at the step 139 the value is not within 10% of the stored value, control passes to the step 116 in order to begin processing from step 116 onward, as described above.

Returning to the step 112, if the CD FLAG is set, indicating that a new trend history is to be constructed, control passes from the step 112 to a step 140, where the current value is stored. After the step 140 is a step 142, where a new trend is calculated using the most recent three stored values and the least squares algorithm to calculate a line through the three points.

After the step 142 is a test step 144 where the new trend is examined for validity. A trend is deemed to be invalid if the correlation coefficient, calculated at the step 142, is less than 0.8. A possible explanation for an invalid trend is the failure of one or more components of the system 20. If at the step 144 the trend is deemed not to be valid, control passes to a step 146, where a message is posted to the cockpit display 28 indicating that an instrument check is appropriate. After the step 146 is a step 148, where trending is reinitialized in order to collect more points to attempt to construct another trend.

If at the step 144 the correlation coefficient is greater than or equal to 0.8, control passes to a step 150, where the CD FLAG is reset in order to allow normal monitoring processing (i.e. the path through the steps 116, 118, 120, etc.) on the next iteration. After the step 150 is a step 152, where a limit check is performed on the current value. The limit check at the step 152 is the same as the limit check at the step 120. If the current value is either less than GOAL or is greater than GOAL but not projected to exceed SPEC within four hours, the current value has not exceeded the limits and processing for the current iteration is complete. Otherwise, control passes from the step 152 to a step 154, where the status message to be posted on the cockpit display 28 is determined. The method of determining the particular status message to be issued at the step 154 is the same as the method used at the step 122.

Although the system 20 is illustrated herein for a UH-60A helicopter, it can be appreciated by those skilled in the art that the system 20 can be adapted to work with many other types of helicopters. Similarly, the specific vibrations being monitored and the frequencies at which the vibrations are monitored can be changed without departing from the spirit and scope of the invention.

The specific hardware illustrated herein which is shown being used for data collection, processing, user fault notification, and user input may be modified or replaced with functionally equivalent hardware without departing from the spirit and scope of the present invention. Furthermore, any portion of the software illustrated herein may be implemented using equivalent hardware, which would be straightforward in view of the hardware/software equivalence discussed (in another field) in U.S. Pat. No. 4,294,162 entitled "Force Feel Actuator Fault Detection with Directional Threshold" (Fowler et al.).

Even though the present invention has been illustrated by constructing a linear trend using three data points, the invention may be practiced by constructing trends using any number of data points and employing other types of non-linear functions, such as a decaying exponential function. Furthermore, even though the monitoring functions, as illustrated in FIG. 3, are being applied to vibration data only, it can be appreciated by one skilled in the art that these functions may be applied to other types of parameters.

Although the invention has been shown and described with respect to exemplary embodiments thereof, it should be understood by those skilled in the art that various changes, omissions and additions may be made therein and thereto, without departing from the spirit and the scope of the invention.

We claim:

1. Apparatus, for performing maintenance monitoring of a helicopter, comprising:
    regime indication means, for providing a regime signal indicative of the regime of the helicopter;
    vibration sensing means, responsive to vibrations at various locations throughout the helicopter, for providing a plurality of sensed vibration signals wherein each of said vibration signals is indicative of the vibration at a particular one of said locations; and
    processing means, responsive to said regime indication means and to said vibration sensing means, for providing a fault signal in response to one of said sensed vibration signals exceeding a value, wherein said value is a function of said sensed vibration signal and the regime of the helicopter.

2. Apparatus, for performing maintenance monitoring of a helicopter, according to claim 1, further comprising:
    display means, for providing a textual message on an electronic screen in response to assertion of said fault signal.

3. Apparatus, for performing maintenance monitoring of a helicopter, according to claim 2, further comprising:
    storage means, responsive to said vibration sensing means and to said regime indication means, for accumulating stored sensed vibration signals and for providing said stored signals to said processing means which uses said stored signals to generate a plurality of vibration functions, wherein each of said vibration functions represents the magnitude of a particular one of said vibration signals as a function of time at a particular regime of the helicopter.

4. Apparatus, for performing maintenance monitoring of a helicopter, according to claim 3, wherein said processing means uses said vibration functions to generate predicted values for corresponding ones of said sensed vibration signals and wherein said processing means asserts said fault signal in response to the value of one or more of said sensed vibration signals not being within a predetermined percentage of the value of one or more of corresponding ones of said predicted values.

5. Apparatus, for performing maintenance monitoring of a helicopter, according to claim 4, wherein said regime indication means is comprised of:
   flight parameter sensing means, for sensing signals indicative of weight on wheels, main rotor speed, airspeed, engine torque, rate of climb, angle of bank, yaw rate, and helicopter height; and
   processing means, for providing said regime signal in response to said flight parameter sensing means, wherein the value of said regime signal varies according to the values of said weight on wheels, main rotor speed, airspeed, engine torque, rate of climb, angle of bank, yaw rate, and helicopter height signals.

6. Apparatus, for performing maintenance monitoring of a helicopter, according to claim 5, wherein said vibration sensing means is comprised of a plurality of accelerometers attached at said locations throughout the helicopter.

7. Apparatus, for performing maintenance monitoring of a helicopter, according to claim 6, wherein said vibration functions are linear.

8. Apparatus, for performing maintenance monitoring of a helicopter, comprising:
   a regime indicator, for providing a regime signal indicative of the regime of the helicopter;
   a plurality of vibration sensors, responsive to vibrations at various locations throughout the helicopter, for providing a plurality of sensed vibration signals wherein each of said vibration signals is indicative of the vibration at a particular one of said locations; and
   a processor, responsive to said regime indicator and to said vibration sensors, for providing a fault signal in response to one of said sensed vibration signals exceeding a value, wherein said value is a function of said sensed vibration signal and the regime of the helicopter.

9. Apparatus, for performing maintenance monitoring of a helicopter, according to claim 8, further comprising:
   a display, for providing a textual message on an electronic screen in response to assertion of said fault signal.

10. Apparatus, for performing maintenance monitoring of a helicopter, according to claim 9, further comprising:
    electronic storage, responsive to said vibration sensors and to said regime indicator, for accumulating stored sensed vibration signals and for providing said stored signals to said processing means which uses said stored signals to generate a plurality of vibration functions, wherein each of said vibration functions represents the magnitude of a particular one of said vibration signals as a function of time at a particular regime of the helicopter.

11. Apparatus, for performing maintenance monitoring of a helicopter, according to claim 10, wherein said processor uses said vibration functions to generate predicted values for corresponding ones of said vibration signals and wherein said processor asserts said fault signal in response to the value of one or more of said vibration signals not being within a predetermined percentage of the value of one or more of corresponding ones of said predicted values.

12. Apparatus, for performing maintenance monitoring of a helicopter, according to claim 11, wherein said regime indicator is comprised of:
    flight parameter sensors, for sensing signals indicative of weight on wheels, main rotor speed, airspeed, engine torque, rate of climb, angle of bank, yaw rate, and helicopter height; and
    processing means, for providing said regime signal in response to said flight parameter sensors, wherein the value of said regime signal varies according to the values of said weight on wheels, main rotor speed, airspeed, engine torque, rate of climb, angle of bank, yaw rate, and helicopter height signals.

13. Apparatus, for performing maintenance monitoring of a helicopter, according to claim 12, wherein said vibration sensors are comprised of a plurality of accelerometers attached at said locations throughout the helicopter.

14. Apparatus, for performing maintenance monitoring of a helicopter, according to claim 13, wherein said vibration functions are linear.

15. A method of monitoring a helicopter, comprising the steps of:
    determining the regime of the helicopter;
    measuring a plurality of vibrations at various locations throughout the helicopter to provide a plurality of vibration signals wherein each of said vibration signals is indicative of the vibration at a particular one of said locations; and
    generating a fault signal by comparing the magnitude of each of said vibration signals to values, wherein each of said values is a function of said vibration signals and the regime of the helicopter.

16. A method of monitoring a helicopter, according to claim 15, further comprising the step of:
    providing a textual message on an electronic screen in response to assertion of said fault signal.

17. A method of monitoring a helicopter, according to claim 16, further comprising the steps of:
    storing said signals;
    generating a plurality of vibration functions, wherein each of said functions represents the magnitude of a particular one of said vibration signals as a function of time for a particular regime of the helicopter;
    calculating, using said functions, a predicted value for each of said vibration signals; and
    asserting said fault signal in response to the value of one or more of said vibration signals not being within a predetermined percentage of the value of one or more of corresponding ones of said predicted values.

18. A method of monitoring a helicopter, according to claim 17, wherein said vibration functions are linear.

* * * * *